(12) United States Patent
Tang

(10) Patent No.: US 11,115,978 B2
(45) Date of Patent: Sep. 7, 2021

(54) SIGNALING TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/474,716

(22) PCT Filed: Jan. 5, 2017

(86) PCT No.: PCT/CN2017/070321
§ 371 (c)(1),
(2) Date: Jun. 28, 2019

(87) PCT Pub. No.: WO2018/126409
PCT Pub. Date: Jul. 12, 2018

(65) Prior Publication Data
US 2019/0349925 A1 Nov. 14, 2019

(51) Int. Cl.
*H04W 72/04* (2009.01)
*H04W 16/28* (2009.01)

(52) U.S. Cl.
CPC ..... *H04W 72/0446* (2013.01); *H04W 72/042* (2013.01); *H04W 16/28* (2013.01)

(58) Field of Classification Search
CPC .............. H04W 16/28; H04W 72/042; H04W 72/0446

(Continued)

(56) References Cited

U.S. PATENT DOCUMENTS

2012/0127938 A1\* 5/2012 Lv ................... H04W 72/1205
370/329
2013/0215844 A1\* 8/2013 Seol ..................... H04B 7/0695
370/329

(Continued)

FOREIGN PATENT DOCUMENTS

CN 100342664 10/2007
CN 102791036 11/2012

(Continued)

OTHER PUBLICATIONS

Qualcomm, "Mini-slot design for mmW," 3GPP TSG RAN WG1 Meeting #87 R1-1612015, Nov. 2016, 5 pages.

(Continued)

*Primary Examiner* — Robert J Lopata
(74) *Attorney, Agent, or Firm* — Hodgson Russ LLP

(57) ABSTRACT

An embodiment of the present disclosure discloses a method and a device for transmitting signaling and device, including: receiving, by a terminal, a first downlink control channel of a group of downlink control channels transmitted by a network device, wherein the first downlink control channel carries first indication information, the first indication information is used to indicate at least one piece of time domain resource information of the at least one downlink control channel of the group of downlink control channels, and the group of downlink control channels is used for a group of terminals in a cell. In the embodiments of the present disclosure, the beamforming gain of the control channel won't be destroyed, and it can effectively satisfy the coverage performance of a high frequency band of a future communication system while avoiding blind detection of the control channel.

9 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2014/0133346 | A1* | 5/2014 | Kang | H04L 5/0053 370/252 |
| 2014/0177561 | A1* | 6/2014 | Yu | H04W 72/042 370/329 |
| 2014/0348093 | A1 | 11/2014 | Ihm et al. | |
| 2014/0348099 | A1* | 11/2014 | Kim | H04L 5/0055 370/329 |
| 2016/0192336 | A1 | 6/2016 | Choi et al. | |
| 2017/0164346 | A1* | 6/2017 | Ohwatari | H04W 72/04 |
| 2018/0034585 | A1* | 2/2018 | Kim | H03M 13/091 |
| 2018/0242282 | A1* | 8/2018 | Li | H04W 72/042 |
| 2019/0020445 | A1* | 1/2019 | Kim | H04L 1/0067 |
| 2019/0089499 | A1* | 3/2019 | Nam | H04B 7/0617 |
| 2019/0215812 | A1* | 7/2019 | Lyu | H04L 5/0092 |
| 2019/0254120 | A1* | 8/2019 | Zhang | H04W 80/02 |
| 2019/0261367 | A1* | 8/2019 | Wu | H04L 5/0094 |
| 2019/0306847 | A1* | 10/2019 | Seo | H04L 25/022 |
| 2019/0349854 | A1* | 11/2019 | Nagaraja | H04W 52/0229 |
| 2019/0349915 | A1* | 11/2019 | Ahn | H04B 7/0695 |
| 2019/0387504 | A1* | 12/2019 | Jung | G06F 17/142 |
| 2020/0077368 | A1* | 3/2020 | Tang | H04L 5/0007 |
| 2020/0213978 | A1* | 7/2020 | Iyer | H04L 5/0053 |

FOREIGN PATENT DOCUMENTS

| | | |
|---|---|---|
| CN | 103891373 | 6/2014 |
| CN | 104868975 | 8/2015 |
| CN | 102791036 | 1/2016 |
| CN | 105813027 | 7/2016 |
| EP | 2861029 | 1/2016 |
| EP | 3051734 | 8/2016 |
| RU | 2514855 | 5/2014 |
| WO | 2016013750 | 1/2016 |
| WO | 2018126357 | 7/2018 |

OTHER PUBLICATIONS

WIPO, ISR for PCT/CN2017/070321, dated Oct. 11, 2017.
EPO, Office Action for EP Application No. 17890705.1, dated Dec. 5, 2019.
Huawei et al., "Discussion on sTTI scheduling schemes," 3GPP TSG RAN WG1 Meeting #87, R1-1613028, Nov. 2016, 7 pages.
ZTE, "ProSe UE-to-Network Relay," SA WG2 Meeting #98, S2-133038, Jul. 2013, 3 pages.
ISEDC, Office Action for CA Application No. 3048929, dated Aug. 3, 2020.
EPO, Office Action for EP Application No. 17890705.1, dated Aug. 5, 2020.
SIPO, First Office Action for CN Application No. 201780078756.X, dated May 18, 2020.
SIPO, Notification to Grant Patent Right for Invention for CN Application No. 201780078756.X, dated Aug. 4, 2020.
FSIP, Office Action for RU Application No. 2019124426-07, dated Jun. 15, 2020.
IPI, Office Action for IN Application No. 201917030503, dated Dec. 29, 2020.
ISDEC, Office Action for CA Application No. 3048929, dated May 14, 2021.
TIPO, Office Action for TW Application No. 106146664, dated Apr. 30, 2021.

* cited by examiner

SIGNALING TRANSMISSION METHOD AND DEVICE

CROSS-REFERENCE TO RELATED APPLICATION

This application is a U.S. national phase application of International Application No. PCT/CN2017/070321, filed Jan. 5, 2017, the entire disclosure of which is incorporated herein by reference.

TECHNICAL FIELD

The present disclosure relates to the technical field of communication, and in particular, to a method and a device for transmitting signaling.

BACKGROUND

In a Long Term Evolution (LTE) system, the time domain position of the Physical Downlink Control Channel (PDCCH) is completely fixed, and is located at the several symbols at the beginning of each 1 ms sub-frame. The terminal only has to blindly detect within the several symbols to receive the PDCCH. A 5th Generation (5G) New Radio (NR) system will introduce multi-beam technology in high frequency band (>6 GHz). That is, the base station transmits signals of a plurality of beams alternately in a time division mode, and in a time unit transmits signals only on certain beams to concentrate energy and expand coverage. Therefore, in a time period, it requires to arrange transmission time periods for a plurality of PDCCHs and corresponding physical downlink data channels PDSCHs. Therefore, the structures of the PDCCH and PDSCH of the 5G NR system have to be redesigned. At the recent 3GPP conference, various schemes have been proposed for the 5G high-band multi-beam control channel.

Existing scheme 1. As shown in FIG. 1, this is a scheme proposed for the 5G high-band multi-beam control channel (see RAN1 #87 conference document R1-1612015, Mini-slot design for mmW, Qualcomm). A time slot is divided into a plurality of mini-slots, and each mini-slot corresponds to one or a group of Beams. The mini-slot includes downlink data channel PDSCHs of terminals within the coverage of the beams, but the corresponding downlink control channel PDCCHs for scheduling these PDSCHs are not arranged in the same mini-slot. Instead, one PDCCH is shared by a plurality of mini-slots and is uniformly placed at the beginning of the slot. The advantage of this structure is that the structure is simple and closest to the PDCCH structure of LTE. However, in this scheme, the downlink control channel is a control channel shared by all beams, and the beamforming gain cannot be obtained, and it is difficult to meet the coverage requirement in the 5G high frequency band.

Existing scheme 2. As shown in FIG. 2, this is another scheme proposed for the 5G high-band multi-beam control channel (see RAN1 #87 conference document R1-1612015, Mini-slot design for mmW, Qualcomm). The time domain resources are divided into slots or mini-slots, and each slot/mini-slot corresponds to one or more Beams, and the slot/mini-slot includes the PDCCHs and PDSCHs of the terminals within the coverage of the beams (as shown in the lower figure). The network may indicate the time domain density and the transmission period of the PDCCHs through RRC signaling. The advantage of this structure is that the PDCCH and PDSCH can share a reference signal. However, in this scheme, since the number of users and the traffic volume in coverage of each beam vary and change with time, the starting time and duration the PDCCH/PDSCHs in each Beam are flexible. In extreme cases, every symbol may be taken as a starting time point. The time domain position of the PDCCH of each beam is also flexible. In addition, the time domain densities of different PDCCHs are also flexible. The PDCCHs of some beams are relatively frequent, while the PDCCHs of some beams are relatively sparse. If the terminal does not know the position of the PDCCH, the terminal has to blindly detect the PDCCH at all possible positions, which may greatly increase the complexity of the terminal and the battery power consumption. Although the conventional method can configure the time domain density or the transmission period of the PDCCH through RRC signaling, the RRC signaling can only be semi-statically configured. The flexibility is very low, and cannot adapt to the dynamic change of the number of users and the service capacity of each Beam.

For the 5G high-band Multi-beam system, with the conventional scheme, the terminal does not know the position of the PDCCH, and has to blindly detect the PDCCH at all possible positions, which can greatly increase the complexity of the terminal and the battery power consumption. Although the time domain density or the transmission period of the PDCCH can be configured through RRC signaling, the RRC signaling can only be semi-statically configured. The flexibility is very low, and cannot adapt to the dynamic change of the number of users and the capacity of each Beam.

SUMMARY

Embodiments of the present disclosure provide a method and a device for transmitting signaling.

In a first aspect, an embodiment of the present disclosure provides a method for transmitting signaling, including:
receiving, by a terminal, a first downlink control channel of a group of downlink control channels transmitted by a network device, wherein the first downlink control channel carries first indication information, the first indication information is used to indicate at least one piece of time domain resource information of the at least one downlink control channel of the group of downlink control channels, and the group of downlink control channels is used for a group of terminals in a cell.

In a second aspect, an embodiment of the present disclosure provides a method for transmitting signaling, including:
transmitting, by a network device, a first downlink control channel of a group of downlink control channels, wherein the first downlink control channel carries first indication information, the first indication information is used to indicate at least one piece of time domain resource information of the at least one downlink control channel of the group of downlink control channels, and the group of downlink control channels is used for a group of terminals in a cell.

In a third aspect, an embodiment of the present disclosure provides a terminal, where the terminal has a function of implementing actions of the terminal in the foregoing method. The functions may be implemented by hardware or by corresponding software implemented by hardware. The hardware or software includes one or more modules corresponding to the functions described above.

In one possible design, the terminal includes a processor configured to support the terminal in performing the corresponding functions of the above methods. Further, the terminal may further include a transceiver for supporting communication between the terminal and the network device. Further, the terminal may further include a memory coupling with the processor, which stores program instructions and data necessary for the terminal.

In a fourth aspect, an embodiment of the present disclosure provides a network device, where the network device has a function of implementing actions of the network device in the foregoing method. The functions may be implemented by hardware or by corresponding software implemented by hardware. The hardware or software includes one or more modules corresponding to the functions described above.

In one possible design, the network device includes a processor configured to support the network device to perform corresponding functions in the methods described above. Further, the network device may further include a transceiver for supporting communication between the network device and the terminal. Further, the network device can also include a memory coupling with the processor, which stores program instructions and data necessary for the network device.

BRIEF DESCRIPTION OF THE DRAWINGS

The drawings used in the embodiments or the description of the related art will be briefly described below.

DETAILED DESCRIPTION

The technical solutions in the embodiments of the present disclosure will be described below with reference to the accompanying drawings.

Figure 3:
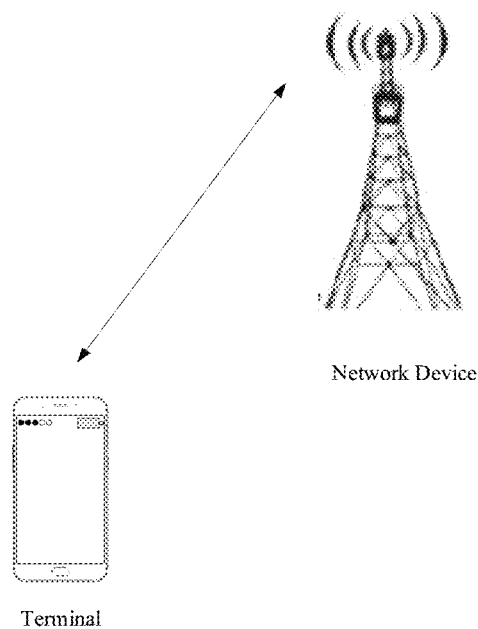
FIG. 3 is a network architecture diagram of a possible communication system according to an embodiment of the present disclosure.

Please refer to FIG. 3, FIG. 3 shows a possible network architecture according to an embodiment of the present disclosure. The network architecture includes a network device and a terminal. When the terminal accesses a mobile communication network provided by the network device, the terminal and the network device can be connected via a wireless link. The network device may be, for example, a 5G network or a base station in a 5G and 4G (4th Generation) hybrid networking system. In the embodiments of the present disclosure, the terms "network" and "system" are often used interchangeably, and those skilled in the art can understand the meaning thereof. The terminal involved in the embodiments of the present disclosure may include various handheld devices, in-vehicle devices, wearable devices, computing devices, or other processing devices connected to the wireless modem, and various forms of user equipment (UE), mobile stations (MSs), terminal devices, and the like. For convenience of description, the devices mentioned above are collectively referred to as terminals.

Figure 4:
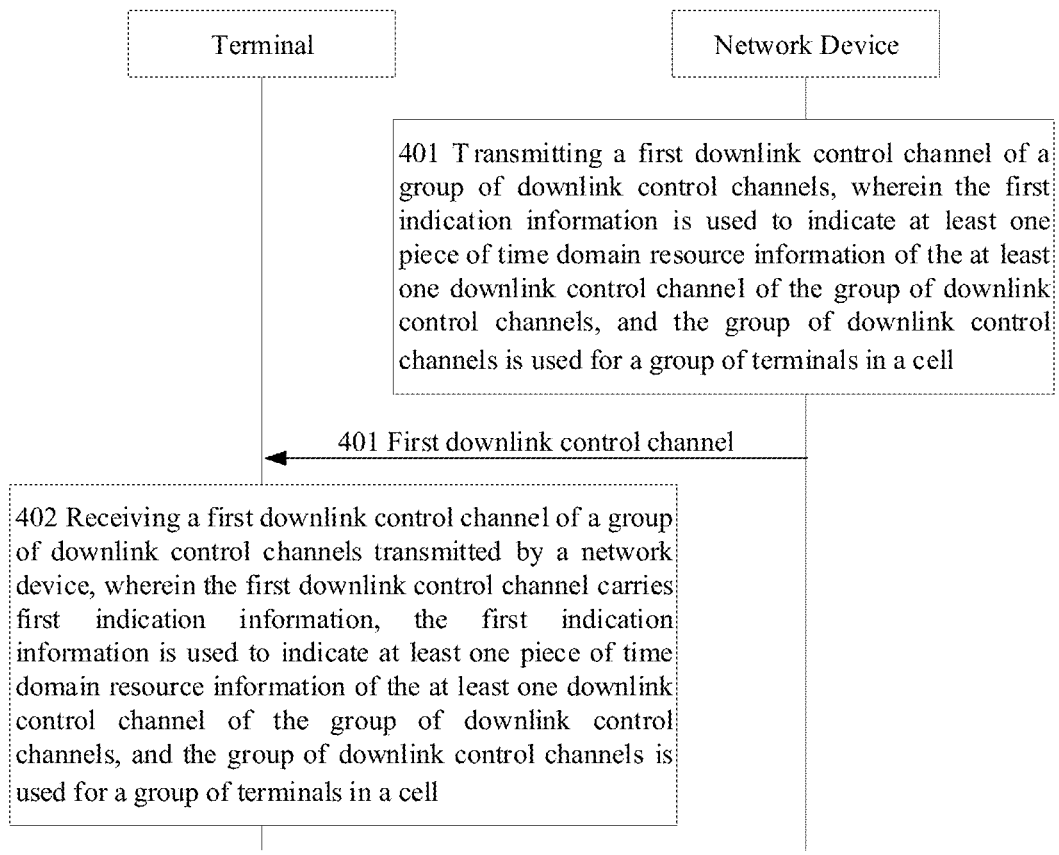
FIG. 4 is a schematic flowchart of a method for transmitting signaling according to an embodiment of the present disclosure.

Referring to FIG. 4, FIG. 4 shows a method for transmitting signaling according to an embodiment of the present disclosure, which is applied to a mobile communication network including a network device and a terminal, where the network device is in communication connection with the terminal, and the method is described from perspectives of the network device and the terminal respectively. The method includes 401~402 as follows.

In 401, the network device transmits a first downlink control channel of a group of downlink control channels, wherein the first downlink control channel carries first indication information, the first indication information is used to indicate at least one piece of time domain resource information of the at least one downlink control channel of the group of downlink control channels, and the group of downlink control channels is used for a group of terminals in a cell.

It is to be understood that the network device transmitting a first downlink control channel of a group of downlink control channels refers to: the network device transmitting downlink control information through a first downlink control channel of a group of downlink control channels. Other similar descriptions in the document may also be interpreted as such, and will not be described again in other similar descriptions.

In a possible example, the time domain resource information includes at least one of the following information of the downlink control channel: a time slot, a minislot, a starting symbol, a time domain length, a time domain density, and a transmission period.

In a possible example, the group of downlink control channels is the nth group of downlink control channels of N groups of downlink control channels that are transmitted by the network device alternately, and the N groups of downlink control channels are used for N groups of terminals in the cell, where n is a positive integer less than or equal to N, and N is a positive integer.

In a possible example, the N groups of downlink control channels are downlink control channels for N groups of beams of the cell.

In a possible example, the first indication information is further used to indicate at least one piece of frequency domain resource information of the downlink control channel.

In a possible example, before the network device transmits the first downlink control channel in the group of downlink control channels, the method further includes:

the network device transmitting second indication information, wherein the second indication information is used to indicate time domain resource information and/or frequency domain resource information of the at least one downlink control channel, and the time domain resource information includes at least one of the following information of the at least one downlink control channel: a time slot, a minislot, a starting symbol, a time domain length, a time domain density, and a transmission period.

The specific implementation of the network device transmitting the second indication information may be:

the network device transmitting the second indication information through a broadcast channel or system information.

In 402, the terminal receives the first downlink control channel of the group of downlink control channels transmitted by the network device, wherein the first downlink control channel carries first indication information, and the first indication information is used to indicate at least one piece of time domain resource information of the at least one downlink control channel of the group of downlink control channels, and the group of downlink control channels is used for a group of terminals in a cell.

In a possible example, before the network device transmits the first downlink control channel of the group of downlink control channels, the method further includes:

the network device transmitting second indication information, wherein the second indication information is used to indicate time domain resource information and/or frequency domain resource information of the at least one downlink control channel, and the time domain resource information includes at least one of the following information of the at least one downlink control channel: a time slot, a minislot, a starting symbol, a time domain length, a time domain density, and a transmission period.

It can be seen that, in the embodiment of the present disclosure, under the control policy of "an antecedent control channel indicating a position of a subsequent control channel", it can realize dynamically indicating the position of the control channel, which can be adapted to the dynamic change of the number of users of each Beam and the capacity of the service. Moreover, it can avoid blind detection of the control channel, and reduce terminal complexity and battery power consumption. In addition, instead of "dependent on cell-level control channel" in the conventional scheme, the present scheme employs a "beam-group-level control channel relay indication" mode, that is, "within one beam group (one user group if from the perspective of the user domain), an antecedent control channel indicating a position of a subsequent control channel". In this way, the beamforming gain of the control channel won't be destroyed, and it can effectively satisfy the coverage performance of a 5G high frequency band while avoiding blind detection of the control channel.

The embodiments of the present disclosure are further described below in conjunction with some specific example scenarios.

Figure 5:
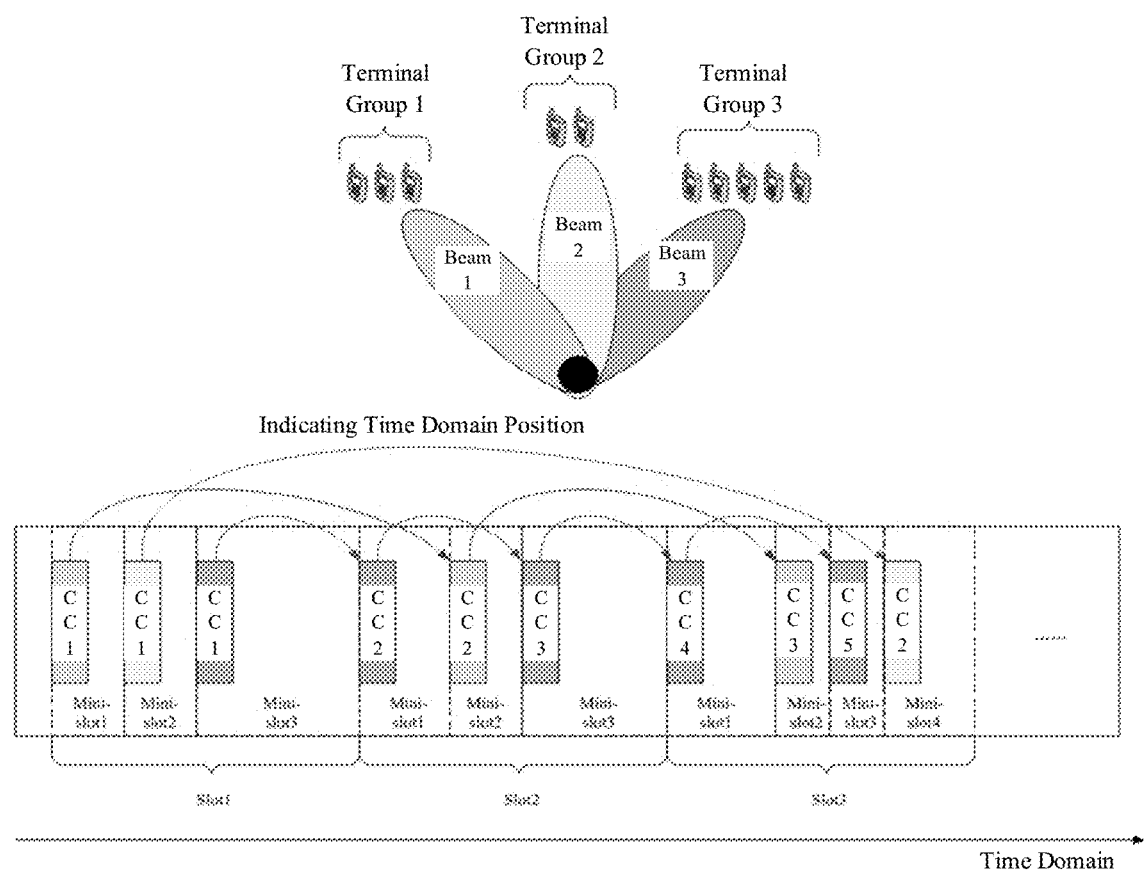
FIG. 5 is a diagram illustrating an exemplary method for transmitting signaling according to an embodiment of the present disclosure.

Referring to FIG. 5, FIG. 5 is a schematic diagram of signaling transmission of a "one-to-one relay indication" between downlink control channels of each beam (terminal group) according to an embodiment of the present disclosure, in which the network device alternately transmits 3 groups of downlink control channels, each group of downlink control channels corresponding to one beam, and corresponding to a group of terminals operating under the coverage of the beam. The "one-to-one relay indication" method is adopted in each group of downlink control channels. That is, the antecedent downlink control channel in the group indicates the time domain position of the subsequent downlink control channel. In this example, one slot contains a plurality of mini-slot mini-slots, and each mini-slot contains one downlink control channel. However, in practice it is also possible that each slot contains one downlink control channel. In this example, one beam corresponds to one mini-slot and one group of terminals. However, in practice, one group of beams may correspond to one mini-slot and one group of terminals.

Figure 6:
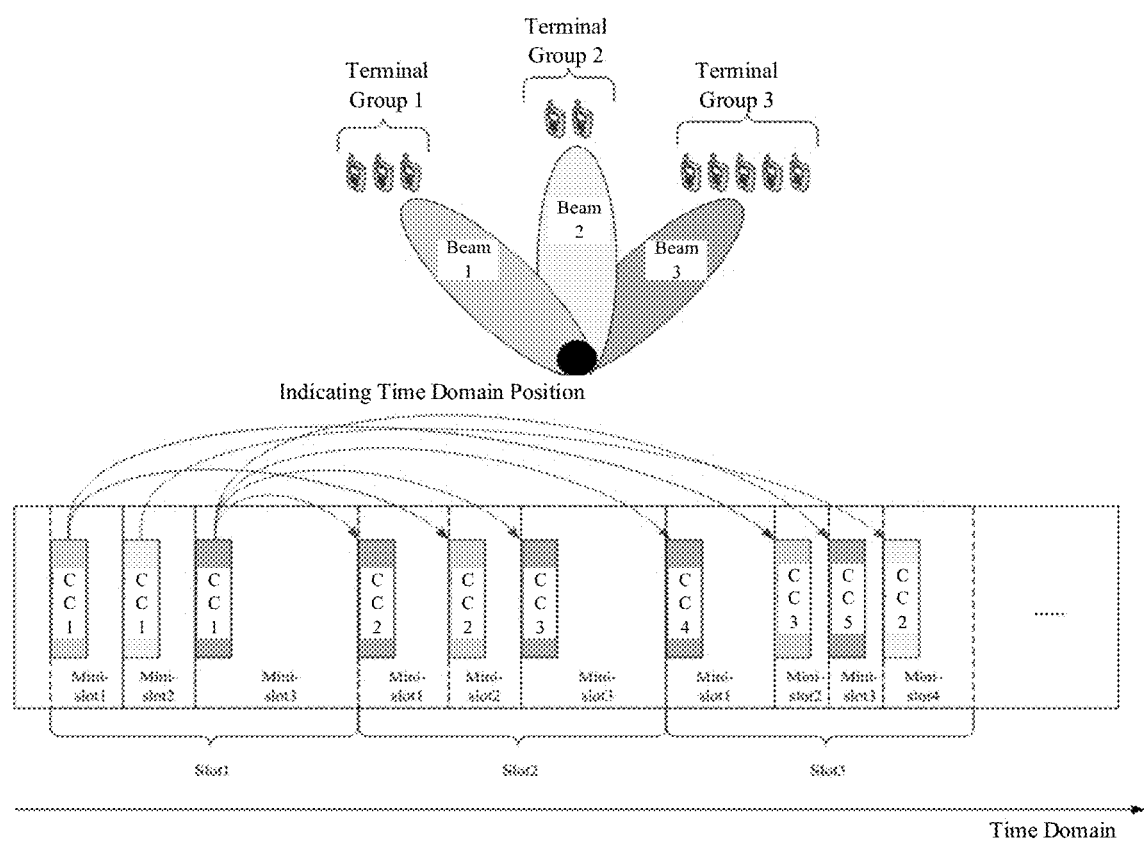
FIG. 6 is a diagram illustrating an exemplary method for transmitting signaling according to an embodiment of the present disclosure.

Referring to FIG. 6, FIG. 6 is a schematic diagram of signaling transmission of a "one-to-many relay indication" between downlink control channels of each beam (terminal group) according to an embodiment of the present disclosure. The present embodiment is extension of the example illustrated in FIG. 5, and each group of downlink control channels adopts a "one-to-many indication" method in the group. That is, one antecedent downlink control channel in the group indicates time domain positions of a plurality of subsequent downlink control channels.

Figure 7:
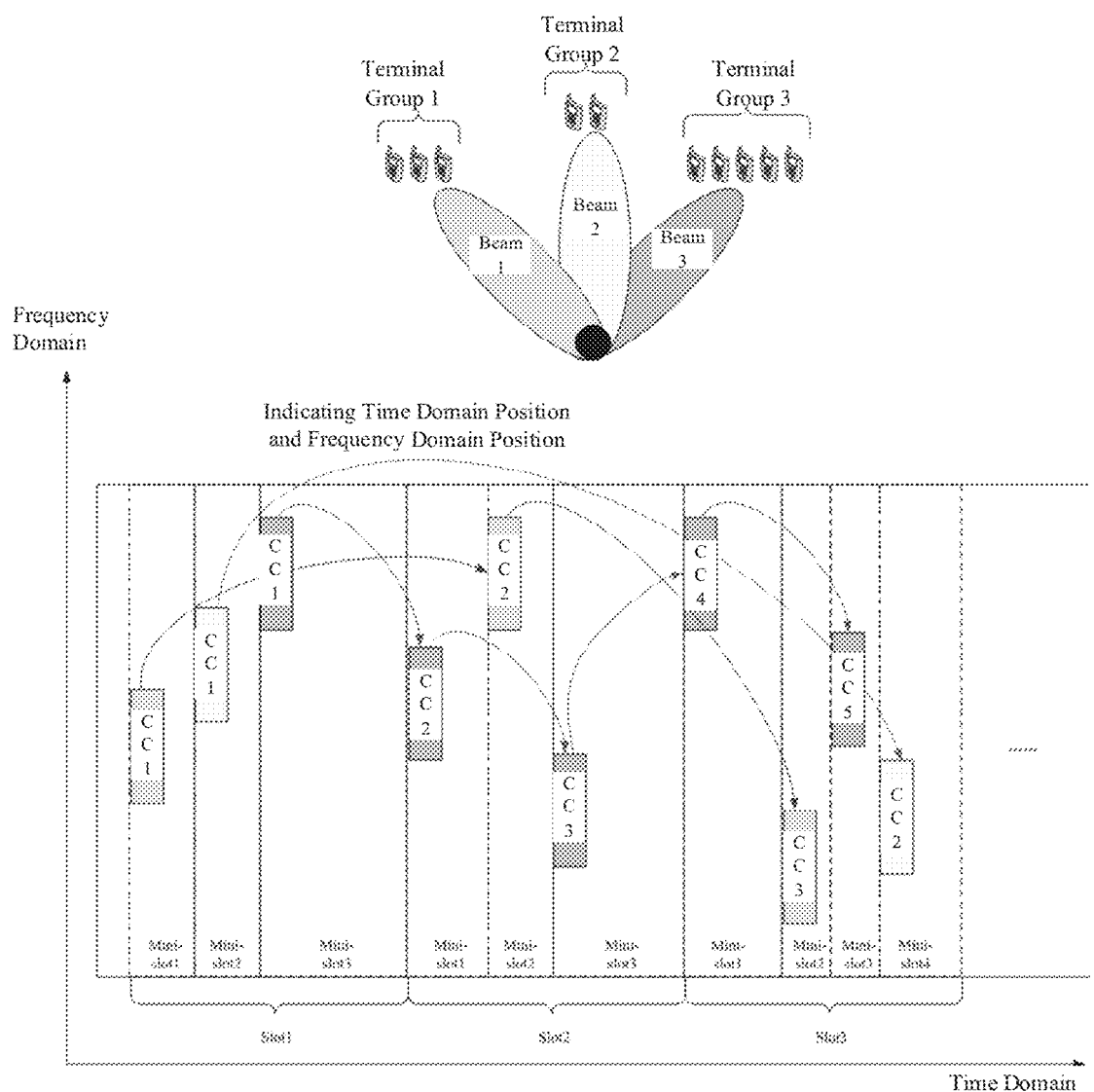
FIG. 7 is a diagram illustrating an exemplary method for transmitting signaling according to an embodiment of the present disclosure.

Referring to FIG. 7, FIG. 7 is a schematic diagram of signaling transmission of a "one-to-one relay indication" (including a frequency domain indication) between downlink control channels of each beam (terminal group) according to an embodiment of the present disclosure. The present embodiment is extension of the example illustrated in FIG. 5. In each group of downlink control channels, one antecedent downlink control channel can indicate both a time domain position and a frequency domain position of one subsequent downlink control channel.

Figure 8:
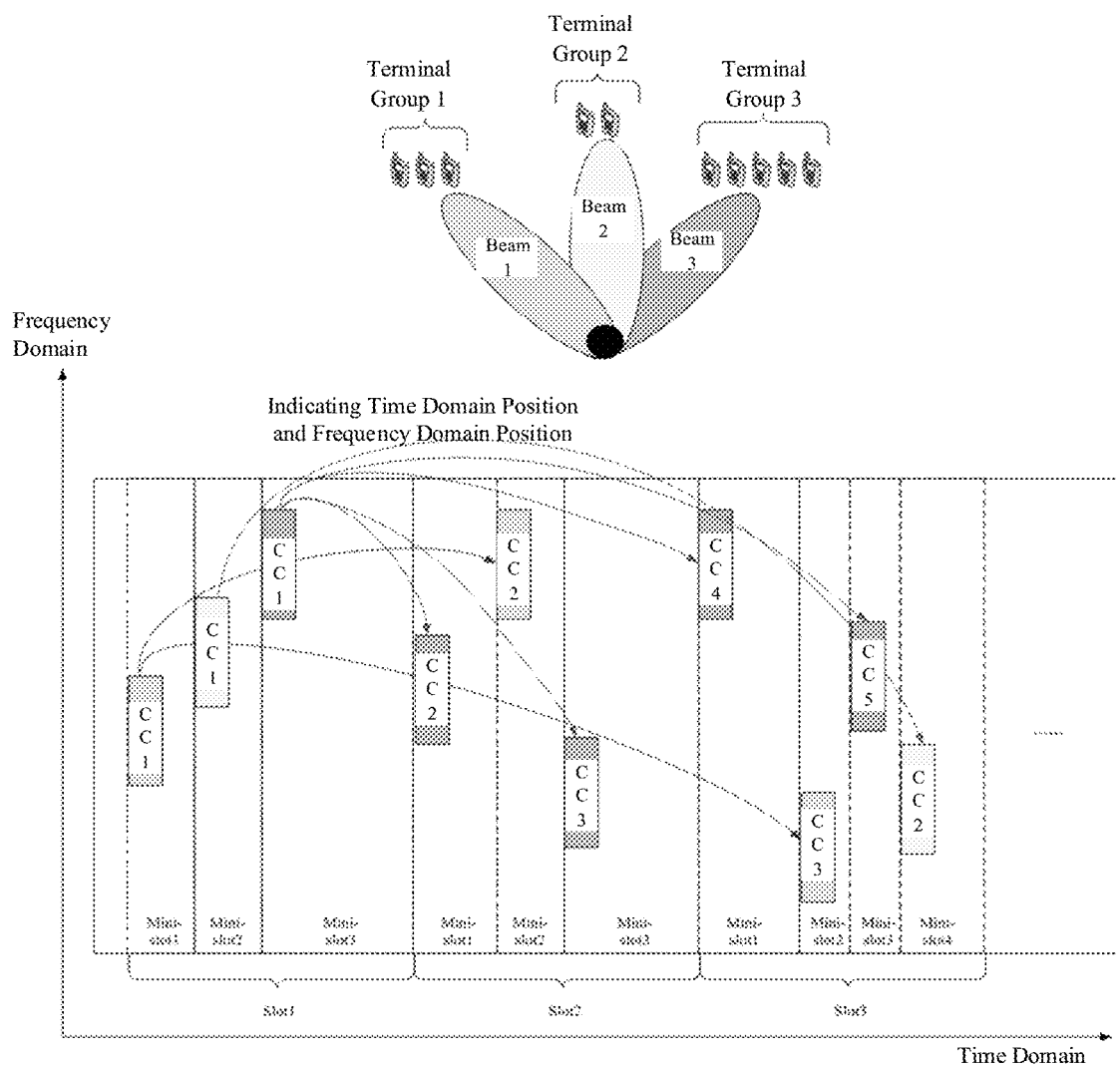
FIG. 8 is a diagram illustrating an exemplary method for transmitting signaling according to an embodiment of the present disclosure.

Referring to FIG. 8, FIG. 8 is a schematic diagram of signaling transmission of a "one-to-many indication" (including a frequency domain indication) between downlink control channels of each beam (terminal group) according to an embodiment of the present disclosure. The present embodiment is extension of the example illustrated in FIG. 6. In each group of downlink control channels, one antecedent downlink control channel can indicate both time domain positions and frequency domain positions of a plurality of subsequent downlink control channels.

Figure 9:
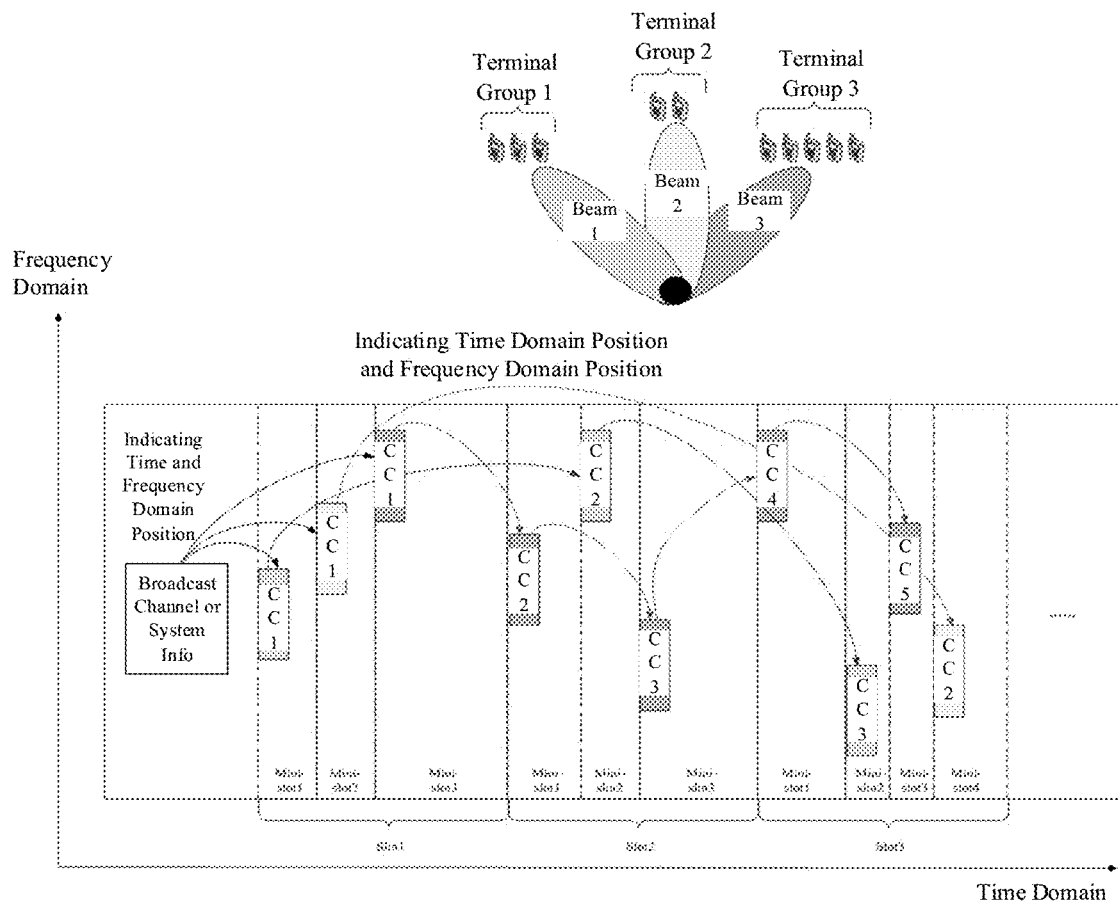
FIG. 9 is a diagram illustrating another exemplary method for transmitting signaling according to an embodiment of the present disclosure.

Referring to FIG. 9, FIG. 9 is a schematic diagram of signaling transmission of a time domain and a frequency domain position of a control channel of each beam (terminal group) indicated by a broadcast channel or system information according to an embodiment of the present disclosure. The present embodiment is extension of the example shown in FIG. 7. The time domain and frequency domain positions of the first one or several downlink control channels in each of the subsequent groups of downlink control channels are indicated through a broadcast channel or system information. Then, in each group of downlink control channels, the time domain and frequency domain positions of one subsequent downlink channel is indicated through one antecedent downlink control channel. In addition, the information such as time domain density and the transmission period of several subsequent downlink control channels may also be indicated through the broadcast channel or the system information.

The foregoing describes the solution of the embodiments of the present disclosure mainly from the perspective of interaction between the network elements. It can be understood that the terminal and the network device include corresponding hardware structures and/or software modules for performing the respective functions in order to implement the above functions. Those skilled in the art will readily appreciate that the present disclosure can be implemented in a hardware or combination of hardware and computer software, in conjunction with the elements and algorithm steps of the various examples described in the embodiments disclosed herein. Whether a function is implemented in hardware or computer software to drive hardware depends on the specific application and design constraints of the solution. A person skilled in the art can use different methods for implementing the described functions for each particular application, but such implementation should not be considered to be beyond the scope of the present disclosure.

The embodiments of the present disclosure may perform the division of functional units on the terminal and the network device according to the foregoing method. For example, each functional unit may be divided according to each function, or two or more functions may be integrated into one processing unit. The above integrated unit can be implemented in the form of hardware or in the form of a software functional unit. It should be noted that the division of the units in the embodiment of the present disclosure is schematic, and is only a logical function division, and the actual implementation may have another division manner.

Figure 1:
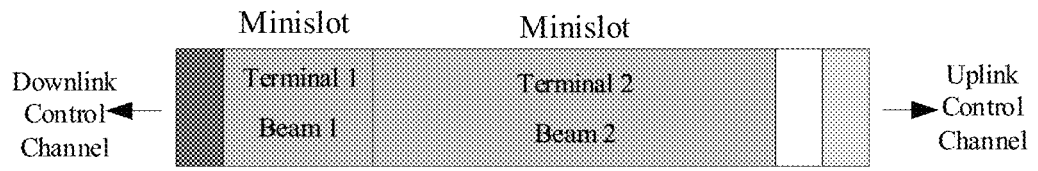
FIG. 1 is a method for transmitting signaling proposed for a 5G high-band multi-beam control channel in the related art.
Figure 2:
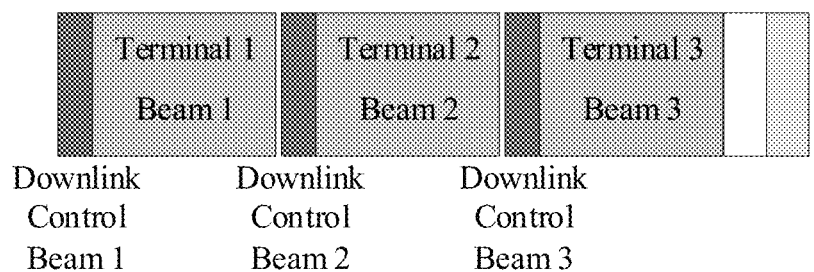
FIG. 2 is another method for transmitting signaling proposed for a 5G high-band multi-beam control channel in the related art.
Figure 10A:
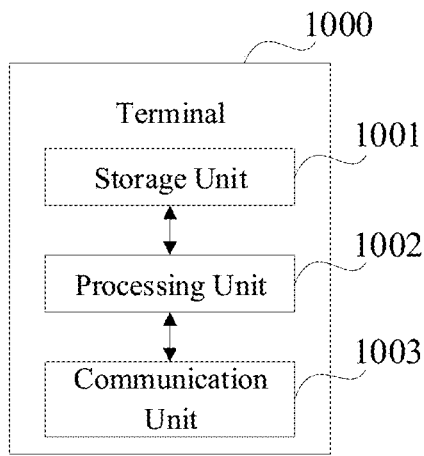
FIG. 10A is a structural block diagram showing functional units of a terminal according to an embodiment of the present disclosure.

In the case of employing an integrated unit, FIG. 10A shows a possible structural diagram of the first core network device involved in the above embodiment. The terminal 1000 includes a processing unit 1002 and a communication unit 1003. The processing unit 1002 is configured to control and manage the actions of the terminal. For example, the processing unit 1002 is configured to support the terminal to perform step 402 in FIG. 4 and/or other processes for the techniques described herein. The communication unit 1003 is for supporting communication between the terminal and other devices, such as communication with the network device shown in FIG. 1. The terminal may further include a storage unit 1001 for storing program codes and data of the terminal.

The processing unit 1002 may be a processor or a controller, such as a central processing unit (CPU), a general-purpose processor, a digital signal processor (DSP), and an application-specific integrated circuit (ASIC), Field Programmable Gate Array (FPGA) or other programmable logic device, a transistor logic device, a hardware component, or any combination thereof. It is possible to implement or carry out the various illustrative logical blocks, modules and circuits described in connection with the present disclosure. The processor may also be a combination of computing functions, for example, including a combination of one or more microprocessors, a combination of a DSP and a microprocessor, and the like. The communication unit 1003 may be a transceiver, a transceiver circuit, or the like, and the storage unit 1001 may be a memory.

The processing unit 1002 is configured to receive a first downlink control channel of a group of downlink control channels transmitted by the network device via the communication unit 1003, wherein the first downlink control channel carries first indication information, and the first indication information is used to indicate at least one piece of time domain resource information of the at least one downlink control channel of the group of downlink control channels, and the group of downlink control channels is used for a group of terminals in a cell.

In a possible example, the time domain resource information includes at least one of the following information of the at least one downlink control channel: a time slot, a minislot, a starting symbol, a time domain length, a time domain density, and a transmission period.

In a possible example, the group of downlink control channels is the nth group of downlink control channels of N groups of downlink control channels that are transmitted by the network device alternately, and the N groups of downlink control channels are used for N groups of terminals in the cell, where n is a positive integer less than or equal to N, and N is a positive integer.

In a possible example, the N groups of downlink control channels are downlink control channels for N groups of beams of the cell.

In a possible example, the first indication information is further used to indicate at least one piece of frequency domain resource information of the downlink control channel.

In a possible example, before the processing unit 1002 receives the first downlink control channel of the group of downlink control channels transmitted by the network device via the communication unit 1003, the processing unit 1002 is further configured to: receive second indication information transmitted by the network device, wherein the second indication information is used to indicate time domain resource information and/or frequency domain resource information of the at least one downlink control channel, and the time domain resource information includes at least one of the following information of the at least one downlink control channel: a time slot, a minislot, a starting symbol, a time domain length, a time domain density, and a transmission period.

Figure 10B:
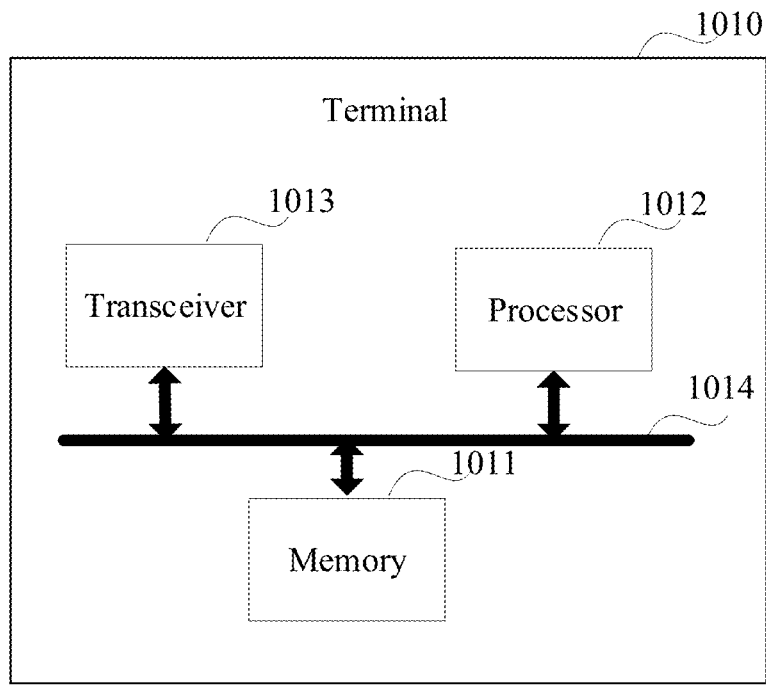
FIG. 10B is a schematic structural diagram of a terminal according to an embodiment of the present disclosure.

When the processing unit 1002 is a processor, the communication unit 1003 is a communication interface, and the storage unit 1001 is a memory, the terminal involved in the embodiment of the present disclosure may be the terminal shown in FIG. 10B.

Referring to FIG. 10B, the terminal 1010 includes a processor 1012, a communication interface 1013, and a memory 1010. Optionally, the terminal 1010 may further include a bus 1014. The communication interface 1013, the processor 1012, and the memory 1010 may be connected to each other through a bus 1014. The bus 1014 may be a Peripheral Component Interconnect (PCI) bus or an Extended Industry Standard Architecture (EISA) bus and the like. The bus 1014 can be divided into an address bus, a data bus, a control bus, and the like. For ease of representation, only one thick line is shown in FIG. 10B, but it does not mean that there is only one bus or one type of bus.

The terminal shown in FIG. 10A or FIG. 10B can also be understood as a device for a terminal, which is not limited in the embodiment of the present disclosure.

Figure 11A:
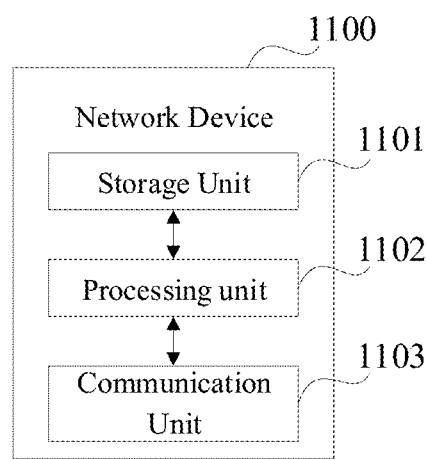
FIG. 11A is a block diagram showing functional units of a network device according to an embodiment of the present disclosure.

In the case of employing an integrated unit, FIG. 11A shows a possible structural diagram of the network device involved in the above embodiment. The network device 1100 includes a processing unit 1102 and a communication unit 1103. The processing unit 1102 is configured to control and manage the actions of the network device. For example, the processing unit 1102 is configured to support the network device to perform step 401 in FIG. 4 and/or other processes for the techniques described herein. The communication unit 1103 is for supporting communication between the network device and other devices, such as communication with the terminal shown in FIG. 1. The network device may further include a storage unit 1101 for storing program codes and data of the network device.

The processing unit 1102 may be a processor or a controller, such as a central processing unit (CPU), a general-purpose processor, a digital signal processor (DSP), and an application-specific integrated circuit (ASIC), Field Programmable Gate Array (FPGA) or other programmable logic device, a transistor logic device, a hardware component, or any combination thereof. It is possible to implement or carry out the various illustrative logical blocks, modules and circuits described in connection with the present disclosure. The processor may also be a combination of computing functions, for example, including a combination of one or more microprocessors, a combination of a DSP and a microprocessor, and the like. The communication unit 1103 may be a transceiver, a transceiver circuit, or the like, and the storage unit 1101 may be a memory.

The processing unit 1102 is configured to transmit a first downlink control channel of a group of downlink control channels via the communication unit 1103, wherein the first downlink control channel carries first indication information, the first indication information is used to indicate at least one piece of time domain resource information of the at least one downlink control channel of the group of downlink control channels, and the group of downlink control channels is used for a group of terminals in a cell.

In a possible example, the time domain resource information includes at least one of the following information of the downlink control channel: a time slot, a minislot, a starting symbol, a time domain length, a time domain density, and a transmission period.

In a possible example, the group of downlink control channels is the nth group of downlink control channels of N groups of downlink control channels that are transmitted by the network device alternately, and the N groups of downlink control channels are used for N groups of terminals in the cell, where n is a positive integer less than or equal to N, and N is a positive integer.

In a possible example, the N groups of downlink control channels are downlink control channels for N groups of beams of the cell.

In a possible example, before the processing unit 1102 transmits the first downlink control channel of the group of downlink control channels via the communication unit 1103, the processing unit 1102 is further configured to transmit second indication information via the communication unit 1103, wherein the second indication information is used to indicate time domain resource information and/or frequency domain resource information of the at least one downlink control channel, and the time domain resource information includes at least one of the following information of the at least one downlink control channel: a time slot, a minislot, a starting symbol, a time domain length, a time domain density, and a transmission period.

Figure 11B:
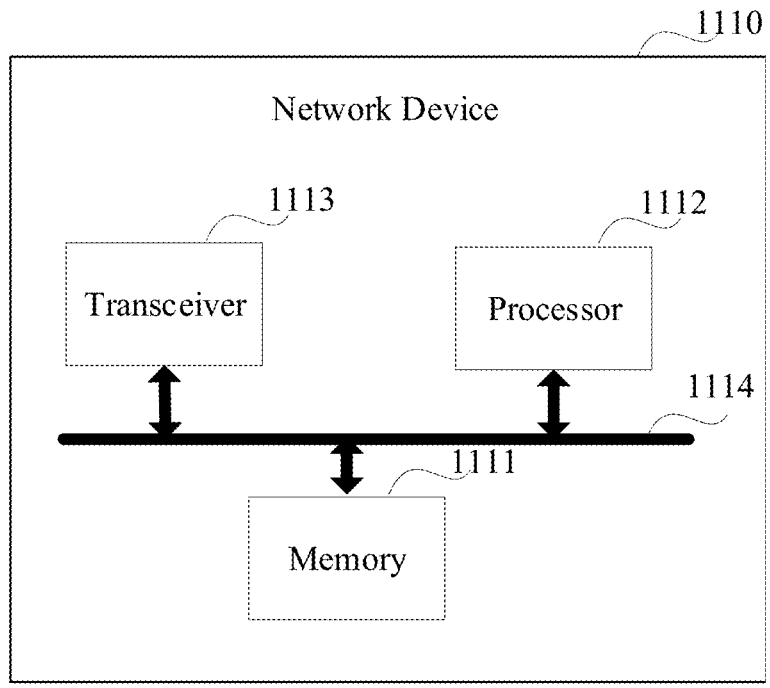
FIG. 11B is a schematic structural diagram of a network device according to an embodiment of the present disclosure.

When the processing unit 1102 is a processor, the communication unit 1103 is a communication interface, and the storage unit 1101 is a memory, the network device according to the embodiment of the present disclosure may be the network device shown in FIG. 11B.

Referring to FIG. 11B, the network device 1110 includes a processor 1112, a communication interface 1113, and a memory 1111. Optionally, the network device 1110 may further include a bus 1114. The communication interface 1113, the processor 1112, and the memory 1111 may be connected to each other through a bus 1114. The bus 1114 may be a Peripheral Component Interconnect (PCI) bus or an Extended Industry Standard Architecture (EISA) bus and so on. The bus 1114 can be divided into an address bus, a data bus, a control bus, and the like. For ease of representation, only one thick line is shown in FIG. 11B, but it does not mean that there is only one bus or one type of bus.

The network device shown in FIG. 11A or FIG. 11B can also be understood as a device for a network device, which is not limited in the embodiment of the present disclosure.

Figure 12:
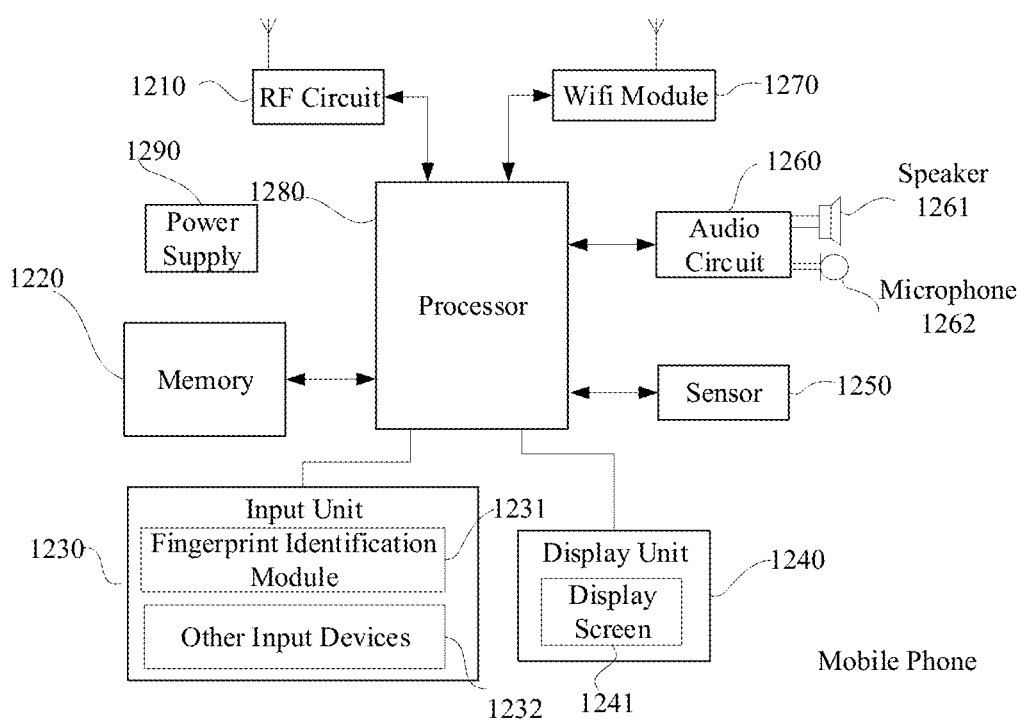
FIG. 12 is a schematic structural diagram of another terminal according to an embodiment of the present disclosure.

An embodiment of the present disclosure further provides another terminal. As shown in FIG. 12, for the convenience of description, only parts related to the embodiment of the present disclosure are shown. If the specific technical details are not disclosed, reference can be made to the method of the embodiments of the present disclosure. The terminal may be any terminal device including a mobile phone, a tablet computer, a Personal Digital Assistant (PDA), a Point of Sales (POS), an in-vehicle computer, and the terminal is a mobile phone as an example.

FIG. 12 is a block diagram showing a partial structure of a mobile phone related to a terminal provided by an embodiment of the present disclosure. Referring to FIG. 12, the mobile phone includes: a radio frequency (RF) circuit 1210, a memory 1220, an input unit 1230, a display unit 1240, a sensor 1250, an audio circuit 1260, a wireless fidelity (WiFi) module 1270, a processor 1280, and a power supply 1290 and other components. It will be understood by those skilled in the art that the structure of the mobile phone shown in FIG. 12 does not constitute a limitation to the mobile phone, and it may include more or less components than those illustrated, or may combine some components, or have different component arrangements.

The components of the mobile phone will be described in the following in detail with reference to FIG. 12:

The RF circuit 1210 can be used for receiving and transmitting information. Generally, the RF circuit 1210 includes, but is not limited to, an antenna, at least one amplifier, a transceiver, a coupler, a Low Noise Amplifier (LNA), a duplexer, and the like. In addition, RF circuitry 1210 can also communicate with the network and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 1220 can be used to store software programs and modules, and the processor 1280 executes various functional applications and data processing of the mobile phone by running software programs and modules stored in the memory 1220. The memory 1220 may mainly include a storage program area and a storage data area, wherein the storage program area may store an operating system, an application required for at least one function, and the like; the storage data area may store data created according to usage of the mobile phone, and the like. Moreover, the memory 1220 can include a high speed random access memory, and can also include a non-volatile memory, such as at least one magnetic disk storage device, a flash memory device, or other volatile solid state storage device.

The input unit 1230 can be configured to receive input numeric or symbol information and to generate key signal inputs related to user settings and function controls of the mobile phone. Specifically, the input unit 1230 may include a fingerprint identification module 1231 and other input devices 1232. The fingerprint identification module 1231 can collect fingerprint data of the user. In addition to the fingerprint identification module 1231, the input unit 1230 may also include other input devices 1232. Specifically, the other input devices 1232 may include, but are not limited to, one or more of a touch screen, a physical keyboard, function keys (such as volume control buttons, switch buttons, etc.), a trackball, a mouse, a joystick, and the like.

The display unit 1240 can be used to display information input by the user or information provided to the user as well as various menus of the mobile phone. The display unit 1240 can include a display screen 1241. Alternatively, the display screen 1241 can be configured in the form of a liquid crystal display (LCD), an organic light-emitting diode (OLED), or the like. Although in FIG. 12, the fingerprint identification module 1231 and the display screen 1241 are used as two separate components to implement the input and input functions of the mobile phone. However, in some embodiments, the fingerprint identification module 1231 and the display screen 1241 may be integrated to achieve the input and playback functions of the mobile phone.

The mobile phone can also include at least one type of sensor 1250, such as a light sensor, a motion sensor, and other sensors. Specifically, the light sensor may include an ambient light sensor and a proximity sensor, wherein the ambient light sensor may adjust the brightness of the display screen 1241 according to the brightness of the ambient light. The proximity sensor may turn off the display screen 1241 and/or backlight when the mobile phone moves close to the ear. As a kind of motion sensor, the accelerometer sensor can detect the magnitude of acceleration in all directions (usually three axes). When it is stationary, it can detect the magnitude and direction of gravity. It can be used to identify the gesture of the mobile phone (such as horizontal and vertical screen switching, related Games, magnetometer attitude calibration), vibration recognition related functions (such as pedometer, tapping), etc.; other sensors such as gyroscopes, barometers, hygrometers, thermometers, infrared sensors, etc. that can be configured on mobile phones are not elaborated herein.

The audio circuit 1260, a speaker 1261, and a microphone 1262 can provide an audio interface between the user and the mobile phone. The audio circuit 1260 can transmit the electrical data converted from the received audio data to the speaker 1261, and convert it into a sound signal by the speaker 1261 for playback. On the other hand, the microphone 1262 converts the collected sound signal into an electrical signal, received by the audio circuit 1260 and converted into audio data, and then processed by the audio data playing processor 1280, transmitted to for example, another mobile phone via the RF circuit 1210, or played to the memory 1220 for further processing.

WiFi is a short-range wireless transmission technology. The mobile phone can help users through the WiFi module 1270 to transmit and receive e-mail, browse the web and access streaming media, etc. It provides users with wireless broadband Internet access. Although FIG. 12 shows the WiFi module 1270, it can be understood that it does not belong to the essential component of the mobile phone, and may be omitted as needed within the scope of not changing the essence of the present disclosure.

The processor 1280 is a control center for the mobile phone that connects various portions of the entire mobile phone with various interfaces and lines. The processor 1280 performs various functions and processing data of a mobile phone, by executing or performing software programs and/or modules stored in the memory 1220, and invoking data stored in the memory 1220, so as to achieve the overall monitoring of the phone. Optionally, the processor 1280 may include one or more processing units. Preferably, the processor 1280 may integrate an application processor and a modem processor. Wherein the application processor mainly processes an operating system, a user interface, an application, and the like. The modem processor primarily handles wireless communications. It will be appreciated that the above described modem processor may also not be integrated into the processor 1280.

The mobile phone also includes a power supply 1290 (such as a battery) that supplies power to the various components. Preferably, the power supply can be logically coupled to the processor 1280 via a power management system to manage functions such as charging, discharging, and power management through the power management system.

Although not shown, the mobile phone may further include a camera, a Bluetooth module, and the like, and details are not described herein again.

In the above embodiments shown in FIG. 4 to FIG. 9, the process on the terminal side in each step method may be implemented based on the structure of the mobile phone.

In the above embodiment shown in FIG. 10A to FIG. 10B, each unit function can be implemented based on the structure of the mobile phone.

An embodiment of the present disclosure further provides a computer storage medium, wherein the computer storage medium can store a program, and when being executed, the program includes some or all of the steps of any one of the method for transmitting signaling described in the above method embodiments.

The steps of the method or algorithm described in the embodiments of the present disclosure may be implemented in a hardware manner, or may be implemented by a processor executing software instructions. The software instructions may be composed of corresponding software modules, which may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disk read only (CD-ROM) or any other form of storage medium known in the art. An exemplary storage medium is coupled to the processor to enable the processor to read information from, and write information to, the storage medium. Of course, the storage medium can also be an integral part of the processor. The processor and the storage medium can be located in an ASIC. Additionally, the ASIC can be located in a gateway device or a mobility management network element. Of course, the processor and the storage medium may also exist as discrete components in the gateway device or the mobility management network element.

It can be seen that, in the embodiment of the present disclosure, under the control policy of "an antecedent control channel indicating a position of a subsequent control channel", it can realize dynamically indicating the position of the control channel, which can be adapted to the dynamic change of the number of users of each Beam and the capacity of the service. Moreover, it can avoid blind detection of the control channel, reduce terminal complexity and battery power consumption. In addition, instead of "dependent on cell-level control channel" in the conventional scheme, the present scheme employs a "beam-group-level control channel relay indication" mode, that is, "within one beam group (one user group if from the perspective of the user domain), an antecedent control channel indicating a position of a subsequent control channel". In this way, the beamforming gain of the control channel won't be destroyed, and it can effectively satisfy the coverage performance of a 5G high frequency band while avoiding blind detection of the control channel.

Those skilled in the art should appreciate that in one or more of the above examples, the functions described in the embodiments of the present disclosure may be implemented in hardware, software, firmware, or any combination thereof. When implemented in software, the functions may be stored in a computer readable medium or transmitted as one or more instructions or codes on a computer readable medium. Computer readable media includes both computer storage media and communication media including any medium that facilitates transfer of a computer program from one position to another. A storage medium may be any available media that can be accessed by a general purpose or a special purpose computer.

The objectives, technical solutions and beneficial effects of the embodiments of the present disclosure are further described in detail through the above specific implementations. It should be understood that the above is only specific implementations of the embodiments of the present disclosure, and is not intended to limit the scope of protection of the embodiments of the present disclosure.

What is claimed is:

1. A method for transmitting signaling with N groups of downlink control channels that are transmitted by a network device alternately, and the N groups of downlink control channels are used for N groups of terminals in a cell, comprising, for each group of downlink control channels form n=1 to n=N:
   receiving, by a terminal, a first downlink control channel of the group of downlink control channels transmitted by the network device, wherein the first downlink control channel carries first indication information, the first indication information is used to indicate at least one piece of time domain resource information of at least one second downlink control channel of the group of downlink control channels, wherein the second downlink control channel carries second indication information being used to indicate at least one piece of time domain resource information of at least one third downlink control channel of the group of downlink control channels, and the group of downlink control channels is used for a group of terminals in the cell;
   wherein before receiving the first downlink control channel of the group of downlink control channels transmitted by the network device, the method further comprises:
   receiving, by the terminal, third indication information transmitted by the network device through a broadcast channel or system information, wherein the third indication information is used to indicate time domain resource information and/or frequency domain resource information of the first downlink control channel; and
   wherein the group of downlink control channels are not in continuous time units,
   wherein n is a positive integer less than or equal to N, and N is a positive integer, and wherein the N groups of downlink control channels are downlink control channels for N groups of beams of the cell.

2. The method according to claim 1, wherein the time domain resource information comprises at least one piece of the following information of the downlink control channel: a time slot, a minislot, a starting symbol, a time domain length, a time domain density, and a transmission period.

3. The method according to claim 1, wherein the first indication information is further used to indicate at least one piece of frequency domain resource information of the downlink control channel.

4. A terminal, comprising: a processor, a memory, and a transceiver, the processor being communicatively coupled to the memory and the transceiver;
   wherein the memory stores program codes and data, and wherein the processor is configured to invoke the program codes and the data to perform a method for transmitting signaling with N groups of downlink control channels that are transmitted by a network device alternately, and the N groups of downlink control channels are used for N groups of terminals in a cell, wherein for each group of downlink control channels form n=1 to n=N:
   the processor being configured to receive, via the transceiver, a first downlink control channel of the group of downlink control channels transmitted by the network device, the first downlink control channel carries first indication information, the first indication information is used to indicate at least one piece of time domain resource information of at least one second downlink control channel of the group of downlink control channels, wherein the second downlink control channel carries second indication information being used to indicate at least one piece of time domain resource information of at least one third downlink control channel of the group of downlink control channels, and the group of downlink control channels is used for a group of terminals in the cell;
   wherein before the processor receives, via the transceiver, the first downlink control channel of the group of downlink control channels transmitted by the network device, the processor is further configured to:
   receive, via the transceiver, third indication information transmitted by the network device through a broadcast channel or system information, wherein the third indication information is used to indicate time domain resource information and/or frequency domain resource information of the first downlink control channel; and
   wherein the group of downlink control channels are not in continuous time units,
   wherein n is a positive integer less than or equal to N, and N is a positive integer, and wherein the N groups of downlink control channels are downlink control channels for N groups of beams of the cell.

5. The terminal according to claim 4, wherein the time domain resource information comprises at least one piece of the following information of the downlink control channel: a time slot, a minislot, a starting symbol, a time domain length, a time domain density, and a transmission period.

6. The terminal according to claim 4, wherein the first indication information is further used to indicate at least one piece of frequency domain resource information of the downlink control channel.

7. A network device, comprising a processor, a memory, and a transceiver, the processor being communicatively coupled to the memory and the transceiver, wherein the memory stores program codes and data, and wherein the processor is configured to invoke the program codes and the data to perform a method for transmitting signaling with N groups of downlink control channels that are transmitted by the network device alternately, and the N groups of downlink control channels are used for N groups of terminals in a cell, wherein for each group of downlink control channels form n=1 to n=N:

transmitting, via the transceiver, a first downlink control channel of the group of downlink control channels, the first downlink control channel carries first indication information, the first indication information is used to indicate at least one piece of time domain resource information of at least one second downlink control channel of the group of downlink control channels, wherein the second downlink control channel carries second indication information being used to indicate at least one piece of time domain resource information of at least one third downlink control channel of the group of downlink control channels, and the group of downlink control channels is used for a group of terminals in the cell;

wherein before the processor transmits the first downlink control channel of the group of downlink control channels via the transceiver, the processor is further configured to transmit, via the transceiver, third indication information through a broadcast channel or system information, wherein the third indication information is used to indicate time domain resource information and/or frequency domain resource information of the first downlink control channel; and wherein the group of downlink control channels are not in continuous time units, wherein n is a positive integer less than or equal to N, and N is a positive integer, and wherein the N groups of downlink control channels are downlink control channels for N groups of beams of the cell.

8. The network device according to claim 7, wherein the time domain resource information comprises at least one piece of the following information of the downlink control channel: a time slot, a minislot, a starting symbol, a time domain length, a time domain density, and a transmission period.

9. The network device according to claim 7, wherein the first indication information is further used to indicate at least one piece of frequency domain resource information of the downlink control channel.

* * * * *